Figure 1:
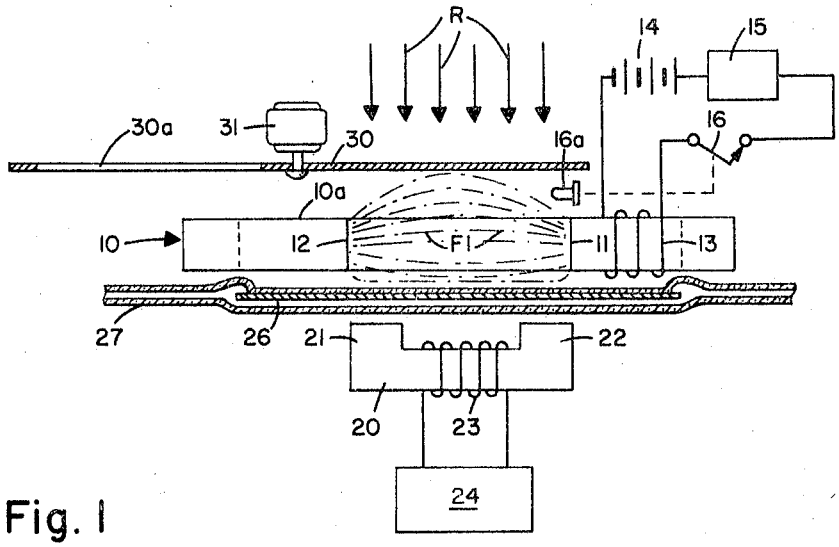

Jan. 28, 1969     C. D. SCHWEBEL     3,424,931

ELECTRIC CURRENT GENERATOR

Filed Oct. 28, 1964

INVENTOR
CHARLES DANA SCHWEBEL

BY

ATTORNEY

United States Patent Office 3,424,931
Patented Jan. 28, 1969

3,424,931
ELECTRIC CURRENT GENERATOR
Charles Dana Schwebel, 978 Trinidad Road,
Cocoa Beach, Fla. 32931
Filed Oct. 28, 1964, Ser. No. 407,017
U.S. Cl. 310—10                          5 Claims
Int. Cl. H02k 1/02

The present invention relates to improved apparatus for converting radiant energy, such as solar infrared energy into usable electric energy.

More particularly, the invention is directed to an improvement in the type of electric generator which induces current in a coil by varying a magnetic flux field associated with the coil by alternately changing the magnetic permeability of a shield or barrier positioned in the flux path which is accomplished by providing a shield of metal, such as niobium, capable of changing from a normal state to a superconducting state in which the lines of flux are repelled or diverted by the shield, the shield permitting passage of the flux when it returns to its normal state.

A principal object of the invention is to provide an improved apparatus for generating electric current of the type mentioned comprising an electromagnet having two spaced poles and an armature forming a flux path between the poles and having a coil thereon in which current is generated in response to changes in the magnetic flux field of the armature, the armature being positioned at one side of the plane common to the poles whereby first and second flux paths are provided, the flux path through the armature being considerably more permeable than the direct path between the poles, a shield disposed between the armature and plane of the poles which is of a suitable metal to be rendered conducting and superconducting, and means being provided for alternately changing the shield from its normal conducting state to a superconducting state and for alternately energizing and deenergizing the electromagnet is synchronism with the changes in the conducting state of the shield whereby when the electromagnet is energized the shield is in its superconducting state which causes the magnetic flux to be repelled from the armature and to travel parallel to the plane of the shield and to the opposite pole of the magnet after which the shield is changed to its normal conducting state thereby permitting the flux to travel through the armature, whereupon the electromagnet is deenergized to collapse the magnetic field. This change in flux path and subsequent interruption of the magnetic field causes a current to be generated in the armature coil, and a spacial arrangement of the elements mentioned causes the shield to be more efficient in repelling the flux path from the armature because the shield is in a plane parallel to the flux path between the poles and when the shield is in its superconducting state the magnetic flux is more readily repelled and maintained in the path between the two poles.

Another object of the invention is the provision of means to limit the voltage in the energizing circuit of the electromagnet so that energy will not be generated in the energizing coil during the change in reluctance of the magnetic circuit when the shield is changed to its normal conducting state.

Figure 2:
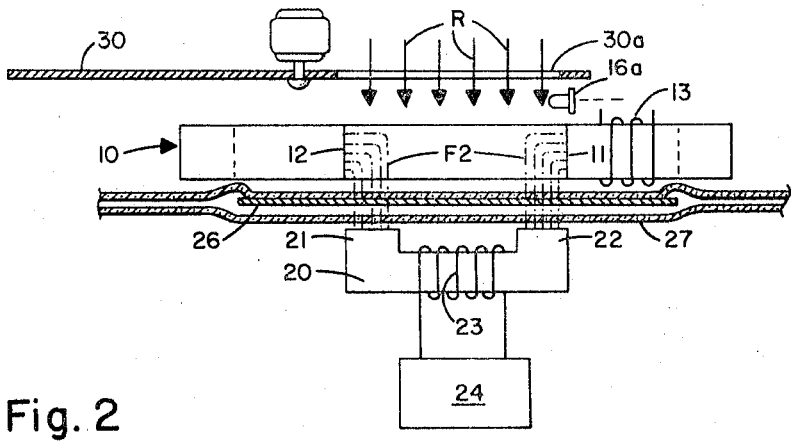

Other objects and advantages of the invention will be apparent from the following description of a preferred form thereof, reference being made to the accompanying drawings wherein FIG. 1 is a schematic showing of a thermoelectric energy conversion apparatus embodying the invention; and FIG. 2 is a fragmentary view of the apparatus shown in FIG. 1 indicating a different path of flow of the magnetic flux lines.

Referring to the drawings, a thermoelectric energy conversion apparatus embodying the invention is shown in schematic form. The apparatus may be enclosed in any suitable housing and for sake of simplicity, it is not shown. Such housing will, of course, be compatible with the use to which the apparatus is subject; for example, the apparatus could be carried by a satellite in orbit about the earth to generate electric current for powering instruments and the like on the satellite and a suitable housing for this environment would be employed.

The apparatus comprises an electromagnet 10 including a suitable core 10a, which is preferably of ferrite in the form of an open ring having opposed poles 11 and 12, respectively, spaced apart and between which a first magnetic flux path F1 may be established. The magnetic flux is provided by a suitable wire coil 13 wound about pole 11 which coil is energized by a circuit including a regulated D-C source 14, voltage limiter 15, and a switch 16. When switch 16 is closed, D-C source 14 furnishes current to coil 13 which establishes a magnetic field in core 10a as is well understood.

An armature 20 is disposed at one side of the plane common to poles 11 and 12, and is preferably formed of ferrite, having poles 21 and 22. Pole 21 is adjacent to pole 12 of magnet 10, and pole 22 of the armature is adjacent to pole 11 of the magnet. An induction coil 23 is wound on core 20 and is connected with a suitable load 24 so that when the magnetic flux flowing through the armature is initiated or terminated the resulting expanding and collapsing of the magnetic flux field induces a current in the coil.

A shield or barrier 26, which is formed of an extremely thin sheet of suitable metal, such as niobium, is interposed in a plane between poles 11 and 12 of electromagnet 10, and poles 21 and 22 of armature 20. The relative thickness of sheet 26 is shown greatly exaggerated in the drawings. Shield 26 is alternately transformed from a normal conducting state to a superconducting state by maintaining it in an environment near absolute zero at which temperature it is in a superconducting state and periodically directing energy rays, such as sunlight, onto the shield to raise its temperature above the superconducting effecting temperature. In the form illustrated, shield 26 is formed of a thin sheet of niobium and is enclosed in a suitable envelope 27 which is preferably formed of quartz and through which a suitable refrigerant such as helium, is passed to produce a superconductive temperature is sheet 26. When the apparatus is used in a satellite, the space environment will be at a temperature near absolute zero also. The refrigerant circulating mechanism is not shown since such systems are known in this art. The temperature of the sheet is raised above its superconductive temperature by radiant energy which is periodically directed thereon and blocked therefrom by a rotary shutter 30 which is driven by a suitable motor 31 and which includes an opening 30a in a portion thereof which admits radiant energy R from a source, not shown. In a satellite, radiant energy is available from the sun's rays.

When shutter 30 is in the position indicated in FIG. 1, the radiant energy is blocked from impinging on sheet 26 and the sheet will be in a cooled superconductive state in which it has nearly zero permeability to magnetic flux and will effectively block the flow of magnetic flux between the poles of the electromagnet 10 and those of armature 20. When shutter 30 is rotated to a position to cause opening 30a to admit radiant energy to the surface of sheet 26 the temperature of the sheet is raised and assumes its normal conductive state and a flux path is then established through armature 20, as is indicated by flux lines F2 in FIG. 2 because the flux path including the armature is far more permeable than the air gap between poles 11 and 12.

Electromagnetic coil 13 is alternately energized and deenergized by switch 16 which is actuated to close and energize magnet coil 13 while shield 26 is in its superconductive state and to open the magnet coil inlet while the shield is in its normal conducting state. In the form shown, switch 16 is actuated by a light or radiant energy sensitive cell 16a which is in the path of the radiant energy admitted through shutter opening 30a and is positioned so that it is actuated to close switch 16 slightly after the energy rays are blocked from the cell and is actuated to open switch 16 after the cell is exposed to energy rays. The synchronizing of the switch operation to the normal and superconducting states of shield 26 can be determined by any suitable expedient such as by causing the lighting and shadowing of cell 16 to occur at proper intervals by spacing and sizing the opening in shutter 30 to which the cell is exposed or by providing a time delay between actuation of the cell by the energy rays. As mentioned previously, coil 13 is energized to establish a magnetic flux path F1 as indicated at FIG. 1 when the shield 26 is in its superconductive state and because the shield extends parallel to the path between poles 11 and 12 any tendency of flux to flow to the armature is effectively blocked. During the time coil 13 is energized, shield 26 is transformed to its normal conducting state by the radiant energy admitted through opening 30a thereby permitting the passage of flux to pass freely therethrough to establish a flux path through armature 20, thereby increasing the flux density about coil 23 and inducing a current therein. Thereafter, light is blocked from cell 16a which then operates switch 16 to open the circuit of coil 13 and deenergize the electromagnet, which results in the collapse of flux field through armature 20, again inducing current in coil 23.

It will be seen that by positioning shield 26 parallel to the direction of the magnetic field and establishing the flux lines in electromagnetic coil 13 during the time plate 26 is in its superconductive condition, the demagnetization coefficient of the shield is close to zero and the critical field at the surface of the plate approaches the maximum thereby providing maximum blockage of flux through the armature and permitting the use of a very thin plate.

At the time shield 26 transforms from a superconductor to a normal conductor thereby altering the flux path to flow therethrough, the resultant decrease in flux path reduces the reluctance of the electromagnetic circuit which results in a generation of an undesirable current in coil 13. To prevent this energy waste, the voltage limiter 15 is provided in the coil circuit to block any voltage exceeding that supplied by the D-C source. The voltage limiter 15 may be of any well known construction and is not described in detail.

Although but one form of the invention has been described other forms, modifications, and adaptations may be made, all falling within the scope of the claims which follow.

Having described my invention, I claim:

1. An electric current generator comprising means forming a flux path including a magnet having spaced opposed poles, an armature positioned to extend between said poles and presenting a flux path to one side of a plane common to said opposed poles, an inducting coil circuit means associated with said armature and affected by changes in flux flow through said armature to induce current flow therein, a shield capable of changing from a state of appreciable magnetic permeability to substantially zero permeability imposed in a plane between said armature and said plane of said poles to intercept the flux path between said poles and said armature, means to control the state of said shield to alternately render it relatively permeable and non-permeable, and means to control the magnetic state of said magnet in synchronism with said means to control the state of said shield.

2. An electric current generator as defined in claim 1 in which said magnet comprises a core and an electromagnetic coil on said core, and the last mentioned means comprising means to periodically energize and deenergize said electromagnetic coil.

3. An electric current generator as defined in claim 1 in which said magnet comprises a core and an electromagnetic coil on said core, the last mentioned means comprising means to periodically energize and deenergize said electromagnetic coil, and means to maintain a substantially steady current in said electromagnetic coil.

4. An electric current generator as defined in claim 1 in which the means to control the state of said shield comprises means to intermittently subject the shield to radiant energy.

5. An electric current generator as defined in claim 2 in which the means to control the state of said shield comprises means to intermittently subject the shield to radiant energy.

References Cited

UNITED STATES PATENTS

| 1,556,183 | 10/1925 | Viz | 310—4 |
| 2,016,100 | 10/1935 | Schwarzkopf | 310—4 |
| 2,914,735 | 11/1959 | Young | 332—51 |

J. D. MILLER, *Primary Examiner.*

DAVID X. SLINEY, *Assistant Examiner.*